(12) United States Patent
Ganley et al.

(10) Patent No.: US 8,452,473 B2
(45) Date of Patent: May 28, 2013

(54) METHOD AND APPARATUS FOR MANAGING TORQUE IN A HYBRID POWERTRAIN SYSTEM

(75) Inventors: Thomas E. Ganley, Novi, MI (US); Sean W. McGrogan, Ann Arbor, MI (US); Jeong J. Park, Ann Arbor, MI (US); Anthony H. Heap, Ann Arbor, MI (US)

(73) Assignee: GM Global Technology Operations LLC, Detroit, MI (US)

(*) Notice: Subject to any disclaimer, the term of this patent is extended or adjusted under 35 U.S.C. 154(b) by 39 days.

(21) Appl. No.: 13/151,327

(22) Filed: Jun. 2, 2011

(65) Prior Publication Data
US 2012/0310454 A1 Dec. 6, 2012

(51) Int. Cl.
*B60L 9/00* (2006.01)
*B60L 11/00* (2006.01)
*B60K 1/00* (2006.01)

(52) U.S. Cl.
USPC ............................................. 701/22; 180/65.1

(58) Field of Classification Search
USPC .................. 701/22; 180/170, 65.265, 65.275, 180/65.28, 65.285; 903/903, 906
See application file for complete search history.

(56) References Cited

U.S. PATENT DOCUMENTS

| | | | | |
|---|---|---|---|---|
| 6,018,694 A * | 1/2000 | Egami et al. | ................... | 701/102 |
| 6,427,100 B1 * | 7/2002 | Kaku et al. | ...................... | 701/22 |
| 6,464,026 B1 * | 10/2002 | Horsley et al. | ............. | 180/65.25 |
| 7,275,518 B1 * | 10/2007 | Gartner et al. | ........... | 123/406.23 |
| 7,967,091 B2 * | 6/2011 | Yamazaki et al. | ....... | 180/65.225 |
| 2003/0125160 A1 * | 7/2003 | Holloway | ...................... | 477/110 |
| 2004/0162184 A1 * | 8/2004 | Segawa et al. | .................. | 477/62 |
| 2006/0025904 A1 * | 2/2006 | McGee et al. | ................... | 701/22 |
| 2006/0199695 A1 * | 9/2006 | Miller et al. | ....................... | 477/2 |
| 2006/0224282 A1 * | 10/2006 | Seo et al. | .......................... | 701/22 |
| 2008/0060858 A1 * | 3/2008 | Sheidler et al. | .............. | 180/65.2 |
| 2008/0243346 A1 * | 10/2008 | Huseman | .......................... | 701/53 |
| 2008/0308066 A1 * | 12/2008 | Martin et al. | .................. | 123/403 |
| 2008/0312034 A1 | 12/2008 | Shultz et al. | | |
| 2009/0071784 A1 | 3/2009 | Combs et al. | | |
| 2009/0215586 A1 * | 8/2009 | Kresse | ........................... | 477/110 |
| 2011/0004383 A1 * | 1/2011 | Seufert et al. | .................... | 701/60 |
| 2011/0139117 A1 * | 6/2011 | Kar et al. | ....................... | 123/395 |
| 2011/0251746 A1 * | 10/2011 | Wu et al. | .......................... | 701/22 |
| 2012/0078536 A1 * | 3/2012 | McGrogan et al. | ............. | 702/41 |

OTHER PUBLICATIONS

U.S. Appl. No. 13/029,381, not pub'd., Michael Arnett.
U.S. Appl. No. 13/151,327, not pub'd., Ganley.
U.S. Appl. No. 13/152,380, not pub'd., Arnett.
U.S. Appl. No. 13/151,373, not pub'd., Haggerty.
U.S. Appl. No. 13/152,328, not pub'd., Whitney.
U.S. Appl. No. 13/170,428, not pub'd., Wang.

* cited by examiner

*Primary Examiner* — Thomas Black
*Assistant Examiner* — Tyler Paige (57) ABSTRACT

A powertrain system includes an internal combustion engine and an electric machine coupled via a torque transfer device to a transmission. A method for operating the powertrain system to transfer torque to a driveline includes establishing an operating torque security limit that is a default torque security limit. The operating torque security limit is set to an override limit when engine speed is less than a threshold speed. A torque security fault is detected only when a combined torque output from the internal combustion engine and the electric machine to the torque transfer device deviates from an operator torque request by an amount greater than the operating torque security limit.

17 Claims, 4 Drawing Sheets

METHOD AND APPARATUS FOR MANAGING TORQUE IN A HYBRID POWERTRAIN SYSTEM

TECHNICAL FIELD

This disclosure is related to torque management in hybrid powertrain systems.

BACKGROUND

The statements in this section merely provide background information related to the present disclosure. Accordingly, such statements are not intended to constitute an admission of prior art.

Known powertrain architectures include torque-generative devices that generate and transfer torque via a torque transmission device to a driveline including one or more drive wheels for traction to propel a vehicle. Torque-generative devices may include, e.g., an internal combustion engine and/or torque machine(s) powered by non-fossil fuel. The torque machine(s) use non-fossil fuels including, e.g., stored electric energy, stored hydraulic energy, and stored pneumatic energy to generate tractive torque. The torque machine(s) may transform vehicle kinetic energy that is transmitted through the drive wheels to energy that is storable in an energy storage device.

Known on-vehicle torque security systems compare an operator torque request with operating commands for the torque-generative devices that are generated by on-board control systems. A known operator torque request may include a vehicle acceleration command, a braking command, a combination of acceleration and braking commands, and others. Known operating commands for torque-generative devices may include air, fuel, and spark commands for internal combustion engines, and electrical current flow and inverter pulsewidth-modulated commands for electric motor/generators.

Known control system remedies include instituting torque limiting operation, short-term or long-term disablement of one of the torque-generative devices, and system shutdown when operating commands for the torque-generative devices deviate from an operator torque request.

SUMMARY

A powertrain system includes an internal combustion engine and an electric machine coupled via a torque transfer device to a transmission. A method for operating the powertrain system to transfer torque to a driveline includes establishing an operating torque security limit that is a default torque security limit. The operating torque security limit is set to an override limit when engine speed is less than a threshold speed. A torque security fault is detected only when a combined torque output from the internal combustion engine and the electric machine to the torque transfer device deviates from an operator torque request by an amount greater than the operating torque security limit.

BRIEF DESCRIPTION OF THE DRAWINGS

One or more embodiments will now be described, by way of example, with reference to the accompanying drawings, in which.

DETAILED DESCRIPTION

Figure 1:
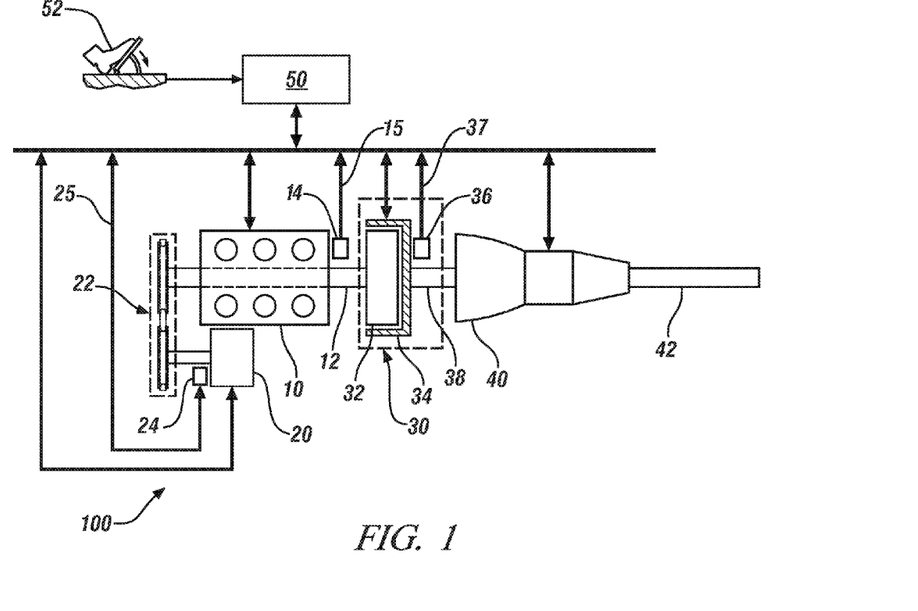
FIG. 1 illustrates a hybrid powertrain system including an internal combustion engine, a torque transfer device, a torque machine, and a transmission device configured to transfer torque to a driveline in accordance with the present disclosure.

Referring now to the drawings, wherein the showings are for the purpose of illustrating certain exemplary embodiments only and not for the purpose of limiting the same, FIG. 1 schematically illustrates a hybrid powertrain system 100 including an internal combustion engine 10, a torque machine 20, and a transmission device 40 configured to transfer torque to a driveline including one or more drive wheels. The internal combustion engine 10, the torque machine 20, and the transmission device 40 are any suitable machines. In one embodiment the torque machine 20 is a multiphase electric motor/generator device that electrically connects to a high-voltage power source via an electric power inverter.

As illustrated, the engine 10 includes a crankshaft 12 that extends beyond each end of the engine 10. The first end of the crankshaft 12 rotatably couples to a mechanical coupler 22, which rotatably couples to the torque machine 20. The mechanical coupler 22 transfers torque between the engine 10 and the torque machine 20, and may include belts, pulleys and idlers, or alternatively may include meshingly engaged gear elements. The illustrative hybrid powertrain system 100 is arranged in a belt-alternator-starter configuration. The second end of the crankshaft 12 rotatably couples to a torque converter 30 having an output member 38 that couples to the transmission 40. The torque converter 30 may be any suitable torque converter device and preferably includes an impeller 32 and corresponding turbine 34. The torque converter 30 may include a controllable torque converter clutch that locks rotations of the impeller 32 and the turbine 34.

A control module 50 monitors inputs from sensors and other sensing devices and controls actuators to operate the hybrid powertrain system 100 in a manner that is responsive to operator commands. Sensors include a first sensor 14 configured to monitor rotational position and speed of the crankshaft 12 and generate a first signal Ne 15, a second sensor 24 configured to monitor rotational position and speed of the torque machine 20 and generate a second signal Nm 25 for feedback and control, and a third sensor 36 configured to monitor rotational speed of the turbine 34 or the output member 38 and generate a third signal $N_T$ 37.

The torque converter 30 operates as an automatic clutch element to transfer torque between the engine 10 and the transmission 40. The torque converter 30 also provides a mechanical buffer between the engine 10 and the transmission 40, acting to absorb torsional vibrations of the engine 10, transmission 40, and driveline 42. The torque converter 30 may also act to dampen variations in the engine speed under certain conditions. Specific engine operating conditions of concern include operating the torque machine 20 to spin the engine 10 during key-on engine starting events and engine restarting events during ongoing powertrain operation. Design features of a torque converter are known and not discussed in detail herein.

Operation of a torque converter, e.g., the torque converter 30, may be characterized in terms of an input speed, input torque, output speed and output torque. As shown, the input speed, engine speed Ne, and pump speed $N_p$ are equivalent states. As shown, the input torque, engine torque Te, and pump torque $T_P$ are equivalent states. Such characteristics include turbine torque $T_T$, which is the torque at the output shaft of the torque converter, i.e., at the output member 38; pump torque $T_P$, i.e., engine torque Te at crankshaft 12; pump speed $N_P$, i.e., the engine speed Ne at the crankshaft 12; turbine speed $N_T$, which is the rotational speed at the output member 38; and K, which is a factor that relates the pump torque to the pump speed that has an application-specific magnitude. Two ratios of interest include a torque ratio $R_T$, which is a ratio between the turbine torque $T_T$ and the pump torque $T_P$, i.e., $T_P/T_T$ and a speed ratio $R_S$, which is a ratio between the turbine speed $N_T$ and the pump speed $N_P$, i.e., $N_P/N_T$.

Figure 2:
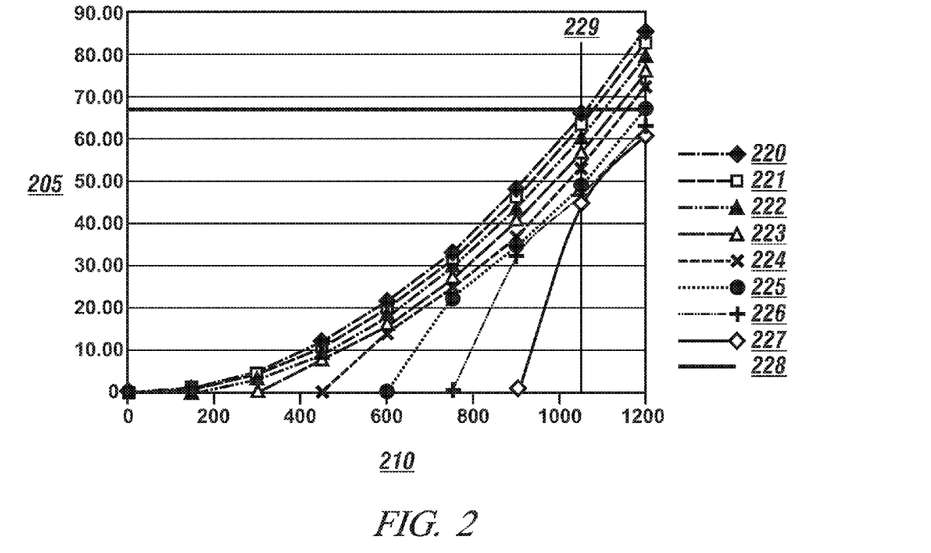
FIG. 2 illustrates data associated with operating a representative torque converter and indicates a torque transfer capability across the torque converter that correlates to engine speed in accordance with the disclosure.

FIG. 2 is a graphical illustration of data associated with operating a representative torque converter and indicates a torque transfer capability across the torque converter that correlates to engine speed when the engine speed is relatively low. The data includes turbine torque (Nm) 205 plotted on the x-axis, i.e., output torque of the torque converter plotted in relation to engine speed (RPM) 210 plotted on the y-axis, i.e., input speed to the torque converter for a plurality of turbine speeds 220-227. A maximum torque limit 228 is also depicted. Turbine speeds associated with the numerals are provided in Table 1.

TABLE 1

| Numeral | Turbine Speed (RPM) |
|---|---|
| 220 | 0 |
| 221 | 100 |
| 222 | 200 |
| 223 | 300 |
| 224 | 400 |
| 225 | 500 |
| 226 | 600 |
| 227 | 700 |

The data indicates that torque input to the torque converter at low engine speeds, e.g., during engine starting and initial operation is relatively low and thus the magnitude of torque transferred across the torque converter is similarly relatively low as indicated by the pump torque $T_P$. The generated torque, i.e., the pump torque $T_P$ does not approach the maximum torque limit 228 until the engine speed is greater than a threshold speed 229, which is about 1050 RPM in the illustrated embodiment. The torque transfer across the torque converter is less than the maximum torque limit 228 regardless of the turbine speed for the embodiment shown. Thus, engine operation below the threshold speed 229 will not violate the maximum torque limit 228. This relation permits setting operating torque security limits for controlling operations of the torque-generative devices, e.g., the engine 10 and the torque machine 20 arbitrarily high when the engine speed Ne and corresponding torque converter pump speed $N_P$ are below the threshold speed 229.

Figure 3:
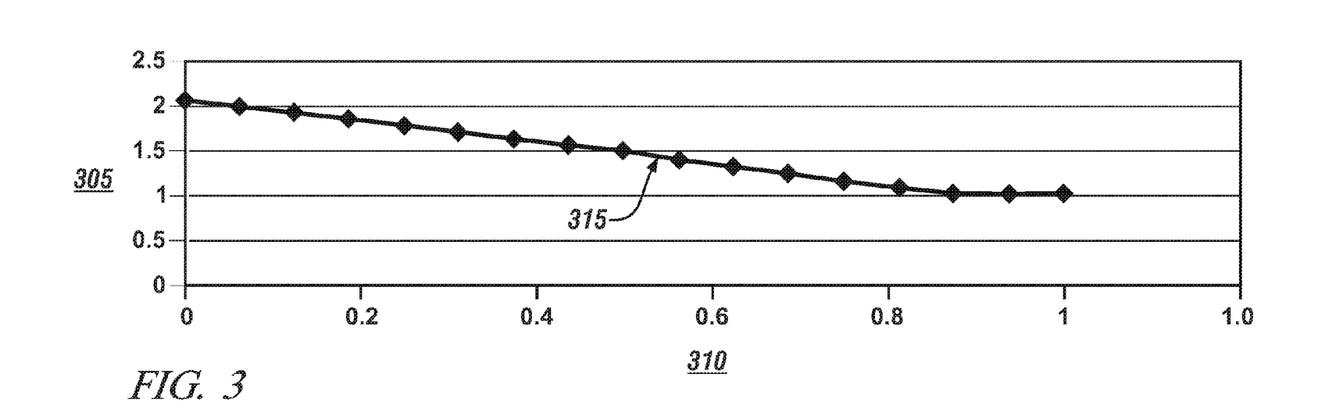
FIG. 3 illustrates data associated with operation of a torque converter, including a relationship between a speed ratio $R_S$ and a torque ratio $R_T$ in accordance with the disclosure.

FIG. 3 graphically shows data associated with operation of a torque converter, including a relationship 315 between a speed ratio $R_S$ and a torque ratio $R_T$, with the speed ratio $R_S$ shown on the x-axis 310 and the torque ratio $R_T$ shown on the y-axis 305. The relationship 315 between the speed ratio $R_S$ and the torque ratio $R_T$ indicate that there is a torque transfer gain across the torque converter until the speed ratio $N_T$ approaches 1.0. The data is illustrative of one embodiment of the torque converter 30.

An equation may be developed that represents the relationship between the speed ratio $R_S$ and the torque ratio $R_T$ using the data depicted in FIG. 3, as follows:

$$R_T = X * R_S \quad [1]$$

wherein X is a scalar quantity. Torque transfer across an unlocked torque converter may be characterized in terms of a pump element, e.g., impeller 32 and a corresponding turbine, e.g., turbine 34. Parameters of interest include the pump speed $N_P$, the pump torque $T_P$, the turbine torque $T_T$, and the turbine speed $N_T$, and an application-specific K factor.

A relationship between pump speed $N_P$, pump torque $T_P$ and the K factor may be expressed as follows.

$$T_P = \left(\frac{N_P}{K}\right)^2 \quad [2]$$

Eqs. 1 and 2 may be combined and rearranged as follows.

$$T_P = \frac{T_T}{X} * \frac{N_P}{N_T} \quad [3]$$

And, combining equations 2 and 3 yields the following relationship.

$$T_T = \frac{X * N_T * N_P}{K^2} \quad [4]$$

Figure 4:
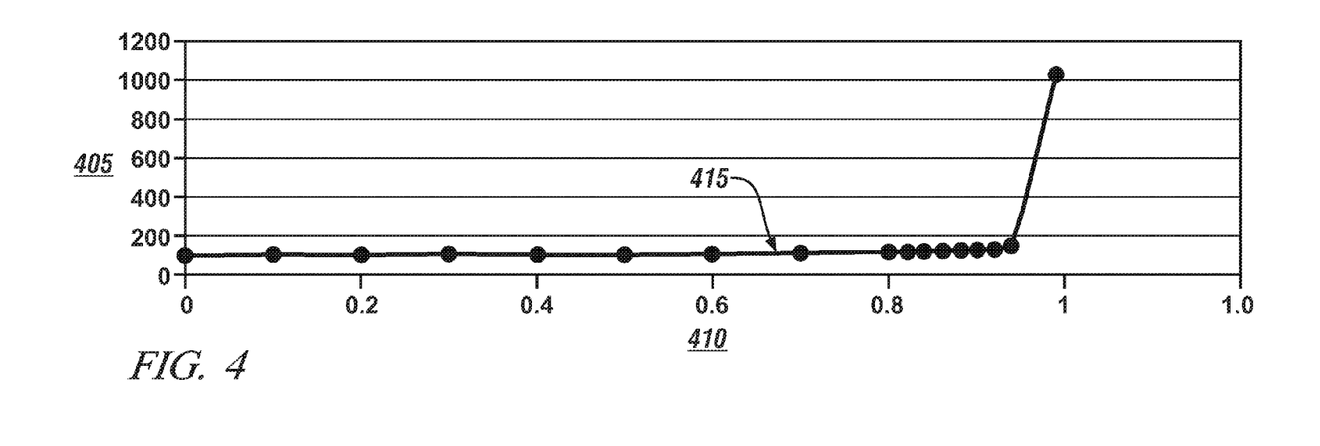
FIG. 4 illustrates data associated with a relationship between the speed ratio $R_S$ and a K factor for a torque converter in accordance with the disclosure.

FIG. 4 graphically shows a relationship between the speed ratio $R_S$ and the K factor 415 for a torque converter, with the speed ratio $R_S$ shown on the x-axis 410 and magnitude of the K factor shown on the y-axis 405. The K factor 415 has a relatively low magnitude until the speed ratio $R_S$ approaches 1.0, indicating an effect on torque transfer across the torque converter. The data is illustrative of one embodiment of a torque converter and is determined by physics thereof. The data may be set forth in a calibration table.

Figure 5:
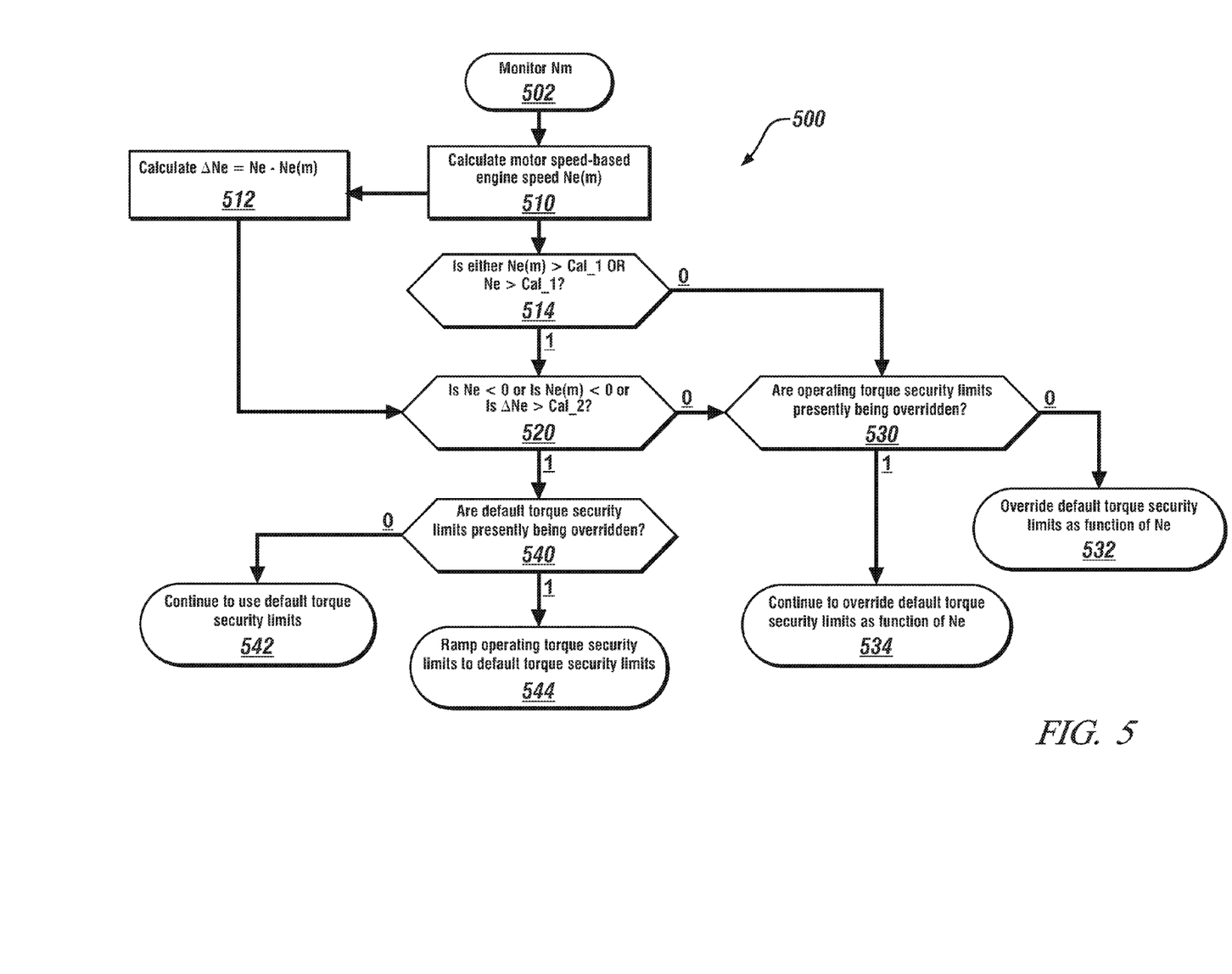
FIG. 5 illustrates a control scheme in form of a flowchart for establishing and adjusting torque limits out of the engine in accordance with the disclosure.

FIG. 5 schematically shows a torque security override control scheme 500 in form of a flowchart, which is executed to establish and adjust operating torque security limits associated with operation of an embodiment of the hybrid powertrain system 100 described with reference to FIG. 1. The torque security override control scheme 500 is preferably reduced to one or more routines that are periodically executed in the control module 50 to establish operating torque security limits. Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other suitable components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event. Table 2 is provided as a key wherein the numerically labeled blocks and the corresponding functions are set forth as follows.

TABLE 2

FIG. 5

| BLOCK | BLOCK CONTENTS |
|---|---|
| 502 | Monitor Nm |
| 510 | Calculate motor speed-based engine speed Ne(m) |
| 512 | Calculate $\Delta Ne = Ne - Ne(m)$ |
| 514 | Is either Ne(m) > Cal_1 OR Ne > Cal_1? |
| 520 | Is Ne < 0 or Is Ne(m) < 0 or Is $\Delta Ne$ > Cal_2? |
| 530 | Are operating torque security limits presently being overridden? |
| 532 | Override default torque security limits as function of Ne |
| 534 | Continue to override default torque security limits as function of Ne |
| 540 | Are default torque security limits presently being overridden? |
| 542 | Continue to use default torque security limits |
| 544 | Ramp operating torque security limits to default torque security limits |

The torque security override control scheme 500 operates as follows. Motor speed Nm is monitored (502). With reference to FIG. 1, motor speed Nm may be the second signal Nm 25 generated using the second sensor 24 indicative of rotational position and speed of the torque machine 20. The motor speed Nm may be used to calculate engine speed, i.e., the motor speed-based engine speed Ne(m) to provide a redundant speed source to secure the engine speed. Thus, speed inputs from presently available speed transducers may be employed, eliminating a need for a secure engine speed sensor.

During each iteration of the torque security override control scheme 500, the motor speed Nm is used to calculate or otherwise determine motor speed-based engine speed Ne(m) using a speed relationship of the mechanical coupling 22 between the engine 10 and the torque machine 20 (510). The motor speed-based engine speed Ne(m) is used to ensure validity of the engine speed signal employed to override the default torque security limits.

A first rationality check of the motor speed-based engine speed Ne(m) determines whether either the engine speed Ne or the motor speed-based engine speed Ne(m) is greater than a first calibrated threshold speed Cal_1 (514), with the calibrated threshold speed corresponding to the threshold speed 229 depicted with reference to FIG. 2. The first calibrated threshold speed Cal_1 is preferably less than a threshold speed point whereat torque safety limits may be overridden but slightly above a speed range whereat the first sensor 14 monitoring engine speed Ne is inaccurate.

When the monitored engine speed Ne from the first sensor 14 and the motor speed-based engine speed Ne(m) from the second sensor 24 agree that the engine speed is low, i.e., both are less than the first calibrated threshold speed Cal_(0), the torque safety limits may be overridden even if one of the first and second sensors 14 and 24 may have an error or fault. This eliminates the comparison of Ne and Ne(m) when they may have a large difference due to poor sensor resolution that occurs at low speeds.

Thus, if the first check (514) fails (1), i.e., if either Ne or Ne(m) are greater than the first calibrated threshold speed Cal_1, then subsequent rationality checks are executed.

Similarly, if the first check (514) passes (0), the subsequent rationality checks (i.e., 520) are ignored and the default torque security limits may be overridden.

Figure 7:
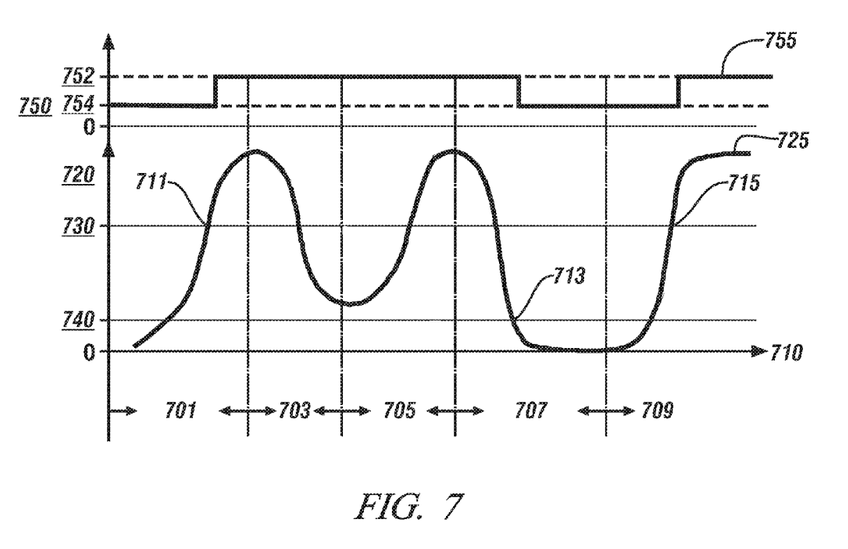
FIG. 7 illustrates data associated with operation of an embodiment of a hybrid powertrain system employing a torque security override control scheme to determine implementation of torque security override based upon a calibrated threshold speed having hysteresis in accordance with the disclosure.

The first calibrated threshold speed Cal_1 may have hysteresis associated therewith. The hysteresis may include a first speed threshold associated with increasing engine speed Ne(m) and a second speed threshold associated with decreasing engine speed Ne(m), wherein the first speed threshold is greater than the second speed threshold. The first speed threshold associated with increasing engine speed Ne(m) is depicted in FIG. 7 as Cal_1_INC and the second speed threshold associated with decreasing engine speed Ne(m) is depicted in FIG. 7 as Cal_1_DEC. The hysteresis may be introduced to accommodate engine events including a key-crank event, an engine stall event, an engine stall save event, an autostop event, and an autostart event. The stall-saver event may be executed to command the torque machine 20 to spin the engine 10 to prevent engine stalling when the engine speed Ne(m) falls below a threshold speed. Under a condition when a fault causes a torque converter clutch to be stuck in a closed position during vehicle operation, a decrease in vehicle speed may force a decrease in the engine speed, which may cause the stall-saver event to execute, with the torque machine 20 spinning and transferring torque through the engine 10 to the transmission 40 and attached driveline 42. The torque transfer from the torque machine 20 may exceed the operating torque security limit, including either the default torque security limit or the override torque security limit, and cause torque transfer and acceleration that is unintended by the operator. Thus, the second speed threshold is set at a lower engine speed level to delay implementing override of the torque security limit when engine speed is decreasing. Similarly, the first speed threshold is set at a greater engine speed level to delay disabling the override of the torque security limit when engine speed is increasing, e.g., during a key-on engine start or an autostart. FIG. 7 graphically shows an embodiment using the first calibrated threshold speed Cal_1 with associated hysteresis.

The engine speed Ne is arithmetically compared to the motor speed-based engine speed Ne(m), i.e., speed difference $\Delta Ne$.

$$\Delta Ne = Ne - Ne(m) \quad (512) \qquad [5]$$

Second, third and fourth rationality checks are executed (520).

The second rationality check determines whether either the engine speed Ne is negative as follows.

$$\text{Is } Ne<0? \qquad [6]$$

When the engine speed Ne is negative, it indicates the engine is spinning backwards, which indicates a fault.

The third rationality check determines whether the motor speed-based engine speed Ne(m) is negative as follows.

$$\text{Is } Ne(m)<0? \qquad [7]$$

When the motor speed-based engine speed Ne(m) is negative, it indicates the engine is spinning backwards, which indicates a fault.

The fourth rationality check determines whether the speed difference ΔNe is greater than a second calibrated value Cal_2 as follows.

$$\text{Is } \Delta Ne > Cal\_2? \qquad [8]$$

When the speed difference ΔNe is greater than the second calibrated value Cal_2, it indicates speed measurement error. The speed difference ΔNe is preferably not an absolute error value because under a condition whereat the motor speed-based engine speed Ne(m) is falsely indicating a higher speed, the engine operation is in a safe state since the torque safety limit overrides will be disabled and the limits will go back to the normally calculated limits. Similarly if the engine speed Ne is corrupted to a low value, the engine operation is in a safe state since Ne(m) is used to redundantly indicate the engine speed.

When all three of the second, third and fourth rationality checks (520) indicate that the system is operating as intended (0), or when the monitored engine speed Ne from the first sensor 14 and the motor speed-based engine speed Ne(m) from the second sensor 24 (514) agree that the engine speed is low (0), the operating torque security limits are reviewed to determine whether the default torque security limits are presently being overridden (530). If the default torque security limits are presently being overridden (1), they continue to be overridden (534). If the default torque security limits were not presently being overridden (0), they are permitted to be overridden (532). Overriding the default torque security limits includes setting operating torque security limits in relation to the engine speed Ne, preferably using the relationship between output torque plotted in relation to engine speed for an embodiment of a torque converter, an example of which is depicted with reference to FIG. 2.

When any one of the second, third and fourth rationality checks (520) indicates a fault (1), the operating torque security limits are reviewed to determine whether they are presently being overridden (540).

If the default torque security limits were not presently being overridden (0), operation of the system using the default torque security limits continues (542).

If the default torque security limits were presently being overridden (1), the override torque security limits are ramped down to the default torque security limits over an elapsed period of time (544). This ramp-down action is undertaken to permit transitions in operating torque security limits without abrupt changes, thus reducing risk of torque bumps caused by operating torque security limits that suddenly interfere with present torque commands.

Figure 6:
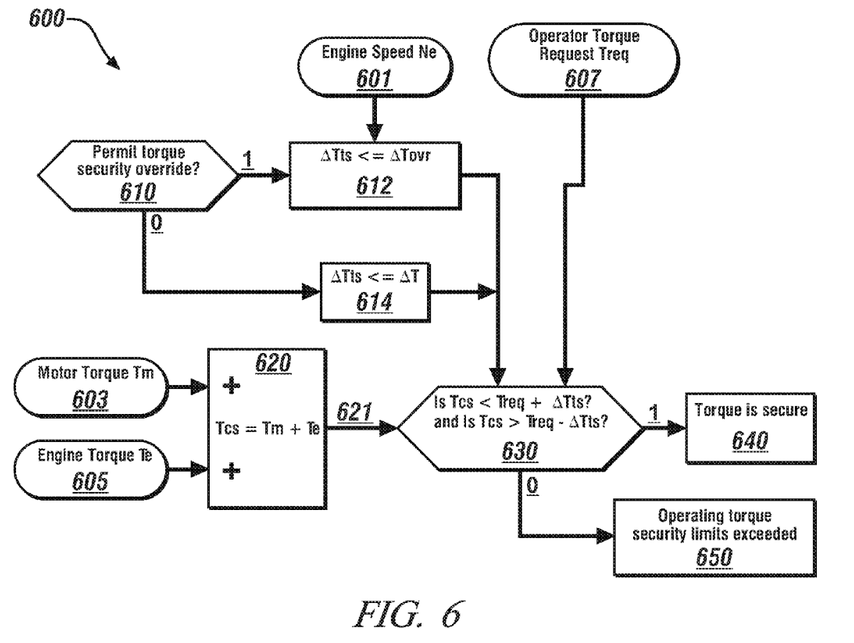
FIG. 6 illustrates a torque security control scheme in form of a process flowchart for establishing and verifying compliance to torque security limits in an exemplary powertrain system in accordance with the disclosure.

FIG. 6 schematically shows a torque security control scheme 600 in form of a process flowchart for establishing and verifying compliance to torque security limits in an exemplary powertrain system including adjusting the operating torque security limits. It is appreciated that verifying compliance with the operating torque security limits is accomplished with reference to the operator torque request and capabilities of the various elements of the powertrain system 100 to generate and transfer torque to the driveline 42.

The torque security control scheme 600 is preferably reduced to one or more algorithms that are periodically executed in a control module to establish operating torque security limits associated with operating a powertrain system, e.g., the hybrid powertrain system 100 described with reference to FIG. 1. Table 3 is provided as a key wherein the numerically labeled blocks and the corresponding functions are set forth as follows.

TABLE 3

| FIG. 6 | |
| --- | --- |
| BLOCK | BLOCK CONTENTS |
| 601 | Engine Speed Ne |
| 603 | Motor Torque Tm |
| 605 | Engine Torque Te |
| 607 | Operator torque request Treq |
| 610 | Permit torque security override? |
| 612 | ΔTts <= ΔTovr |
| 614 | ΔTts <= ΔT |
| 620 | Tcs = Tm + Te |
| 630 | Is Tcs < Treq + ΔTts? and Is Tcs > Treq − ΔTts? |
| 640 | Torque is secure |
| 650 | Operating torque security limits exceeded |

Inputs to the control scheme 600 include engine speed Ne 601, engine torque Te 605, motor torque Tm 603, and the operator torque request Treq 607.

The torque security control scheme 600 operates in response to command(s) that permit, prohibit, and disable overriding default torque security limits, e.g., as described with reference to the torque security override control scheme 500 depicted in FIG. 5 (610).

When a torque security override is not permitted (0), i.e., is either prohibited or has been disabled, operating torque security limits ΔTts are set to the default torque security limits ΔT (614). The default torque security limits ΔT may be set at a magnitude of 0.2 g, or another suitable torque security limit magnitude. This may include comparing engine speed Ne with a threshold engine speed Ne_thd.

When a torque security override is permitted (1), the operating torque security limits ΔTts are set to override limits ΔTovr (612). The override limits ΔTovr may be a single predetermined value that is preferably greater than the default torque security limits ΔT. Alternatively, the override limits ΔTovr may be speed-based torque security limits that vary in relation to the engine speed Ne to permit transitions in torque limits without abrupt changes in the operating torque security limits. This ramp-down of the torque limits reduces risk of torque bumps caused by changes to torque limits that suddenly interfere with present torque commands. The override limits ΔTovr may vary in relation to the engine speed Ne and the torque transfer capability of the torque converter. Suitable speed-based torque security limits are described with reference to FIG. 2. The override limits ΔTovr may be subsequently ramped down over an elapsed period of time, depending upon present and past operating conditions of the powertrain system 100.

The engine torque Te 605 and the motor torque Tm 603 are combined to determine a crankshaft torque Tcs 621 (620).

The crankshaft torque Tcs 621 is compared to the operator torque request 607 with consideration of the operating torque security limits ΔTts (630). It is appreciated that the comparison of the crankshaft torque Tcs 621 and the operator torque request 607 includes allowances for torque losses in the powertrain system 100 and the driveline 42 that are attributable to friction, gear interactions and the like.

When the crankshaft torque Tcs 621 is within an allowable torque range defined by the operator torque request 607 in combination with the operating torque security limits ΔTts (1), the output torque is secure (640).

When the crankshaft torque Tcs 621 falls outside the allowable torque range defined by the operator torque request 607 in combination with the operating torque security limits ΔTts (0), the operating torque security limits have been exceeded (650). Remedial action may be commanded, including limiting torque output of the engine 10 and/or the torque machine 20, or other suitable action.

FIG. 7 graphically shows operation of an embodiment of the hybrid powertrain system 100 employing the torque security override control scheme 500 to determine the first calibrated threshold speed Cal_1, which includes a first calibrated threshold speed Cal_1_INC 730 and a second calibrated threshold speed Cal_1_DEC 740. The first and second calibrated threshold speeds Cal_1_INC 730 and Cal_1_DEC 740 provide hysteresis associated with the torque security limit override control scheme 500. The first speed threshold Cal_1_INC 730 is set at a greater engine speed level than the second speed threshold Cal_1_DEC 740 to delay disabling the torque security limit override when engine speed is increasing, e.g., during a key-on engine start event or an autostart event. The second speed threshold Cal_1_DEC 740 is set at a lower engine speed level to delay implementing any torque security limit override when engine speed is decreasing. Engine speed (RPM) 725 and a corresponding operating torque security limit 755 that is output from the torque security limit override control scheme 500 are depicted in relation to elapsed time (sec) (710) for operating events of the hybrid powertrain system 100. Elapsed time (sec) (710) is shown on the x-axis. Magnitude of the engine speed (RPM) (720) and torque security limits (750) including a default torque security limit (752) and an override limit (754) are shown on the y-axis.

The engine speed 725 is shown increasing and decreasing during periods of operation of the powertrain system with corresponding changes in the operating torque security limit 755. The periods of operation include events that include a key-crank event 701, an engine stall event 703, an engine stall save event 705, an autostop event 707, and an autostart event 709. It is appreciated that the events are shown in a serial fashion for ease of graphical depiction.

During the key-crank event 701, the engine speed 725 is increasing from 0 RPM, the operating torque security limit 755 is set at the override limit (754), indicating that torque security override is permissible.

When the engine speed 725 exceeds the first speed threshold Cal_1_INC 730 at time point 711, the operating torque security limit 755 is set at the default torque security limit (752), indicating that torque security override is no longer permissible.

During a subsequent engine stall event 703, the engine speed 725 decreases, as shown. The operating torque security limit 755 remains set at the default torque security limit (752), indicating that torque security override is not permissible so long as the engine speed 725 does not decrease below the second speed threshold Cal_1_DEC 740, as indicated.

During a subsequent engine stall save event 705, the engine speed 725 increases, as shown. The operating torque security limit 755 remains set at the default torque security limit (752), indicating that torque security override is not permissible so long as the engine speed 725 does not decrease below the second speed threshold Cal_1_DEC 740, as indicated.

During an autostop event 707, the engine speed 725 decreases, as shown. The operating torque security limit 755 remains set at the default torque security limit (752) until the engine speed 725 decreases below the second speed threshold Cal_1_DEC 740, as indicated at time point 713. The operating torque security limit 755 is set at the override limit (754) when the engine speed 725 decreases below the second speed threshold Cal_1_DEC 740 at time point 713.

During an autostart event 709 the engine speed 725 is increasing from 0 RPM, the operating torque security limit 755 is set at the override limit (754), indicating that torque security override is permissible. When the engine speed 725 exceeds the first speed threshold Cal_1_INC 730 at time point 715, the operating torque security limit 755 is set at the default torque security limit (752), indicating that torque security override is no longer permissible.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating a powertrain system configured to transfer torque to a driveline, the powertrain system comprising an internal combustion engine and an electric machine coupled via a torque transfer device to a transmission, the method comprising:
   establishing an operating torque security limit comprising a default torque security limit;
   setting the operating torque security limit to an override limit when engine speed is less than a threshold speed;
   detecting a torque security fault only when a combined torque output from the internal combustion engine and the electric machine to the torque transfer device deviates from an operator torque request by an amount greater than the operating torque security limit; and
   resetting the operating torque security limit to the default torque security limit when the engine speed exceeds the threshold speed.

2. The method of claim 1, wherein setting the operating torque security limit to the override limit when the engine speed is less than the threshold speed comprises increasing the default torque security limit to the override limit, wherein a magnitude of the override limit correlates to the engine speed.

3. The method of claim 1, wherein setting the operating torque security limit to the override limit when the engine speed is less than the threshold speed comprises increasing the default torque security limit to the override limit, wherein a magnitude of the override limit correlates to the engine speed and a torque transfer capability of the torque converter at the engine speed.

4. The method of claim 1, further comprising:
   monitoring a rotational speed of the electric machine; and
   determining an engine speed correlated to the rotational speed of the electric machine.

5. The method of claim 1, wherein resetting the operating torque security limit to the default torque security limit when the engine speed exceeds the threshold speed comprises ramping down the operating torque security limit to the default torque security limit.

6. The method of claim 1, wherein setting the operating torque security limit to the override limit when the engine speed is less than the threshold speed comprises increasing the operating torque security limit to the override limit when the engine speed is less than a first threshold speed, the first threshold speed associated with increasing engine speed.

7. The method of claim 1, wherein setting the operating torque security limit to the override limit when the engine speed is less than the threshold speed comprises increasing the operating torque security limit to the override limit when the engine speed falls below a second threshold speed, the second threshold speed associated with decreasing engine speed.

8. The method of claim 1, wherein setting the operating torque security limit to the override limit when the engine speed is less than the threshold speed further comprises:
  setting a first threshold speed to a magnitude that is greater than a second threshold speed;
  setting the operating torque security limit to the override limit when the engine speed is increasing and is less than the first threshold speed;
  setting the operating torque security limit to the default torque security limit when the engine speed exceeds the first threshold speed; and then
  increasing the default torque security limit to the override limit only when the engine speed subsequently falls below the second threshold speed.

9. The method of claim 8, wherein setting the operating torque security limit to the default torque security limit when the engine speed exceeds the first threshold speed comprises ramping down the operating torque security limit from the override limit to the default torque security limit.

10. The method of claim 8, comprising setting the first threshold speed to a threshold speed associated with increasing engine speed.

11. The method of claim 8, comprising setting the second threshold speed to a threshold speed associated with decreasing engine speed.

12. Method for operating a powertrain system configured to transfer torque to a driveline, the powertrain system comprising an internal combustion engine and an electric machine coupled via a torque converter to a transmission, the method comprising:
  setting an operating torque security limit to an override limit greater than a default torque security limit when engine speed is less than a threshold speed comprising increasing the default torque security limit to the override limit, the override limit correlated to the engine speed and a torque transfer capability of the torque converter at the engine speed; and
  detecting a torque security fault only when a combined torque output from the internal combustion engine and the electric machine to the torque converter deviates from an operator torque request by an amount greater than the operating torque security limit.

13. The method of claim 12, wherein setting the operating torque security limit to the override limit further comprises:
  setting a first threshold speed to a magnitude that is greater than a second threshold speed;
  setting the operating torque security limit to the override limit when the engine speed is increasing and is less than the first threshold speed;
  setting the operating torque security limit to the default torque security limit when the engine speed exceeds the first threshold speed; and then
  increasing the default torque security limit to the override limit only when the engine speed subsequently falls below the second threshold speed.

14. The method of claim 13, wherein setting the operating torque security limit to the default torque security limit when the engine speed exceeds the first threshold speed comprises ramping down the operating torque security limit from the override limit to the default torque security limit.

15. The method of claim 12, wherein setting the operating torque security limit to the override limit greater than the default torque security limit when the engine speed is less than the threshold speed comprises increasing the default torque security limit to the override limit, the override limit correlated to the engine speed.

16. Method for operating a powertrain system configured to transfer torque to a driveline, the powertrain system comprising an internal combustion engine and an electric machine coupled via a torque converter to a transmission, the method comprising:
  setting an operating torque security limit to an override limit greater than a default torque security limit when engine speed is less than a threshold speed;
  detecting a torque security fault only when a combined torque output from the internal combustion engine and the electric machine to the torque converter deviates from an operator torque request by an amount greater than the operating torque security limit; and
  resetting the operating torque security limit to the default torque security limit when the engine speed exceeds the threshold speed.

17. Method for operating a hybrid powertrain system coupled to a driveline, comprising:
  establishing an operating torque security limit associated with torque transfer from the powertrain system to the driveline;
  setting a first threshold speed to a magnitude that is greater than a second threshold speed;
  setting an override torque limit as the operating torque security limit when the engine speed is increasing and is less than the first threshold speed; and
  setting a default torque security limit as the operating torque security limit when the engine speed subsequently exceeds the first threshold speed;
  increasing the default torque security limit to the override torque limit only when the engine speed subsequently falls below the second threshold speed;
  detecting a torque security fault only when a torque output from an internal combustion engine and an electric machine to a torque transfer device deviates from an operator torque request by an amount greater than the operating torque security limit; and
  resetting the operating torque security limit to the default torque security limit when the engine speed exceeds the threshold speed.

* * * * *